INVENTORS
Kurt Hacker
BY Dieter Braun
Michael S. Striker
Attorney

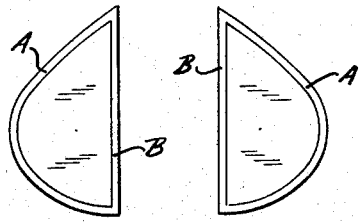

INVENTORS
Kurt Hacker
Dieter Breun
BY Michael S. Striker
Attorney

Feb. 17, 1959     K. HACKER ET AL     2,873,601
SHEET CUTTING APPARATUS
Filed Oct. 3, 1956                                8 Sheets-Sheet 5

INVENTORS
Kurt Hacker
BY Dieter Braun
Michael S. Striker
Attorney

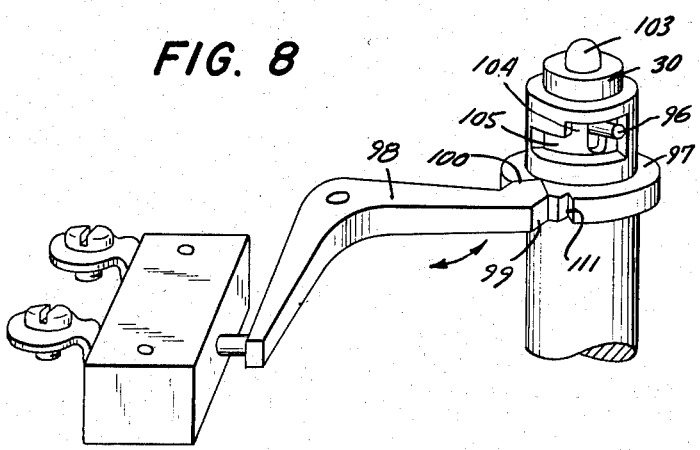
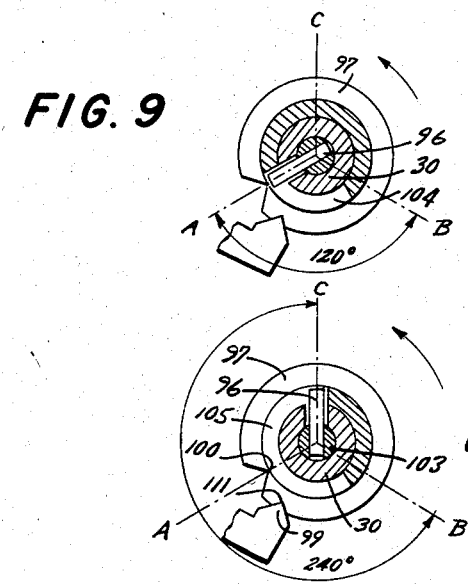
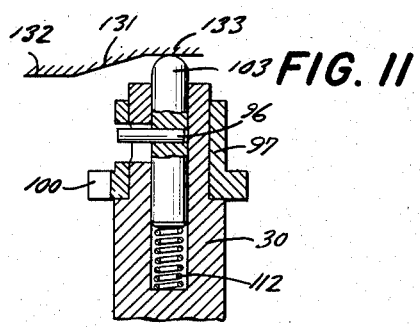

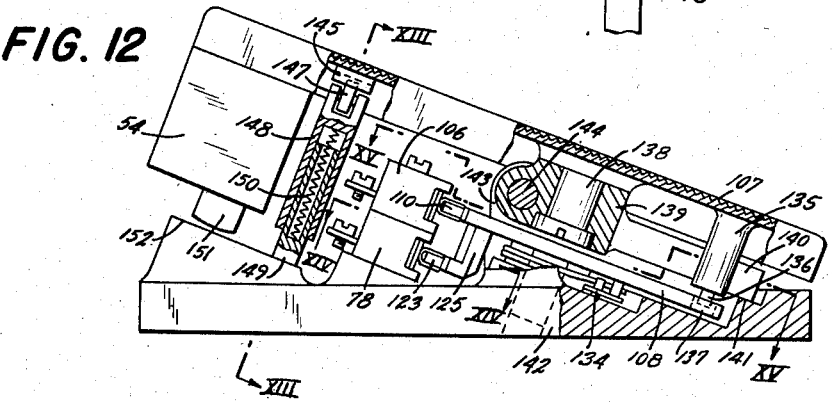
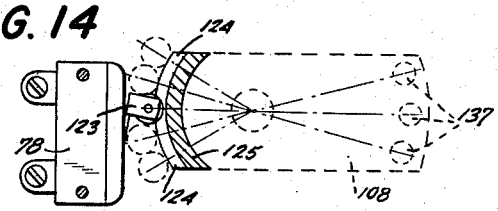
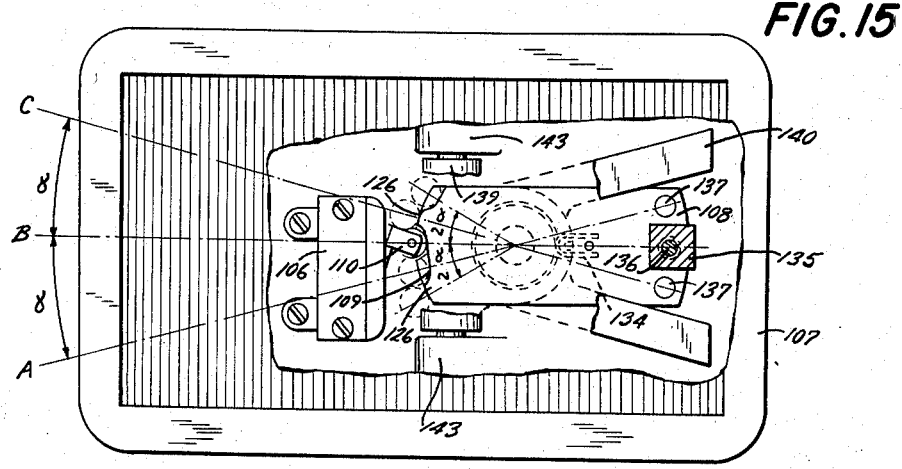

Feb. 17, 1959 K. HACKER ET AL 2,873,601
SHEET CUTTING APPARATUS
Filed Oct. 3, 1956 8 Sheets-Sheet 8

INVENTORS
Kurt Hacker
BY Dieter Braun
Michael S. Striker
Attorney

United States Patent Office 2,873,601
Patented Feb. 17, 1959

2,873,601

SHEET CUTTING APPARATUS

Kurt Hacker, Stuttgart, and Dieter Braun, Stuttgart-Heumaden, Germany, assignors to Firma Fortuna-Werke Spezialmaschinenfabrik A.-G., Stuttgart-Bad Cannstatt, Germany Application October 3, 1956, Serial No. 613,707

Claims priority, application Great Britain October 4, 1955

6 Claims. (Cl. 69—9.5)

The present invention relates to a machine for cutting sheet material, such as leather and the like, such machines being used, for example, in the manufacture of shoes.

This application is a continuation-in-part of copending application Serial No. 487,924, filed February 14, 1955, and entitled "Machine for Cutting Sheet Material," now Patent No. 2,769,329 issued November 6, 1956.

In the manufacture of an article such as shoes, it is necessary to chamfer edges of the most varied curvatures on many different pieces of leather or the like, in order to place the several pieces of sheet material in a proper condition for further manufacture of a shoe, for example. At the present time, a great deal of time is consumed by workers in providing such chamfered edges because it is necessary to cut a series of differently curved edges in succession, and thus far it has been impossible for a worker to cut a series of differently shaped edges in rapid succession with a minimum of inconvenience. For example, it is possible with known machines for a worker to cut two differently shaped edges of a piece of sheet material in order to chamfer such edges, for example, without a great deal of trouble in successively changing from one edge to the other edge, but this necessitates successive cutting of a number of the same pieces. It is not possible with the known machines to cut more than two differently shaped edges without interrupting the operation for manual adjustment of the machine. Thus, where it is desired to cut parts in pairs belonging to a left and right shoe so as not to separate a pair of shoes from each other during the manufacture thereof, a great inconvenience results from the necessity of manually adjusting the machine when changing from one part of one shoe to the corresponding part of the other shoe.

One of the objects of the present invention is to overcome the above drawbacks by providing a machine which allows the operator thereof to handle only the work pieces while at the same time enabling the operator, through actuation of a foot pedal, for example, to set into motion parts which automatically adjust the machine for any desired series of successive operations.

Another object of the present invention is to provide a machine of the above type which may be manually set to cyclically carry through a series of different adjustments in predetermined succession during each cycle or to carry through the same adjustments in reverse succession.

A further object of the present invention is to provide a machine of the above type capable of automatically reversing the sequence of a series of operations.

An additional object of the present invention is to provide a machine capable of adjusting the space and angle between a sheet material guide and a cutter with the angular adjustment entirely independent of the other adjustment.

Still another object of the present invention is to provide a machine where the angle of a guide for the sheet material with respect to the cutter may be manually adjusted independently of the distance between the guide and the cutter.

Also, it is an object of the present invention to provide structure capable of accomplishing all of the above objects and made up of simple and ruggedly constructed parts which are easy to assemble and disassemble and which guarantee a long life to the machine with a minimum of repairs.

With the above objects in view, the present invention mainly consists of a cutting machine for cutting a sheet material, such as leather and the like, this machine including a support means and a cutting means carried by the support means for cutting a sheet material. A guide means is located adjacent the cutting means for guiding the material to be cut by the cutting means. A first adjusting means is operatively connected to the guide means for adjusting the distance between the same and the cutting means, and a second adjusting means is connected to the guide means for adjusting the angle thereof with respect to the cutting means independently of the first adjusting means. A moving means is operatively connected to the first and second adjusting means for actuating the same to set the guide means successively at a plurality of different elevational and angular positions with respect to the cutting means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

Figs. 1a and 1b respectively show diagrammatically the left and right upper toe parts of a pair of shoes;

Figs. 2a and 2b respectively show diagrammatically left and right side parts of a pair of shoes;

Figs. 3a and 3b respectively show diagrammatically left and right upper parts of a pair of shoes;

Fig. 8 is a perspective view of part of the control structure of the invention shown in association with a reversing switch;

Fig. 9 is a sectional view taken through an upper end portion of the structure of Fig. 8;

Fig. 10 is a sectional view taken through an upper portion of the structure of Fig. 8 but at a slightly lower elevation than the section at which Fig. 9 is taken;

Fig. 11 is a sectional elevational view of the structure shown at the right of Fig. 8, Fig. 11 showing this structure in cooperation with a diagrammatically and fragmentarily illustrated control member;

Fig. 12 is a partly sectional side elevational view of a foot pedal structure according to the present invention;

Fig. 13 is a fragmentary partly sectional elevational view taken along line XIII—XIII of Fig. 12 in the direction of the arrows;

Fig. 14 is a fragmentary plan view, partly in section.

Figure 16:
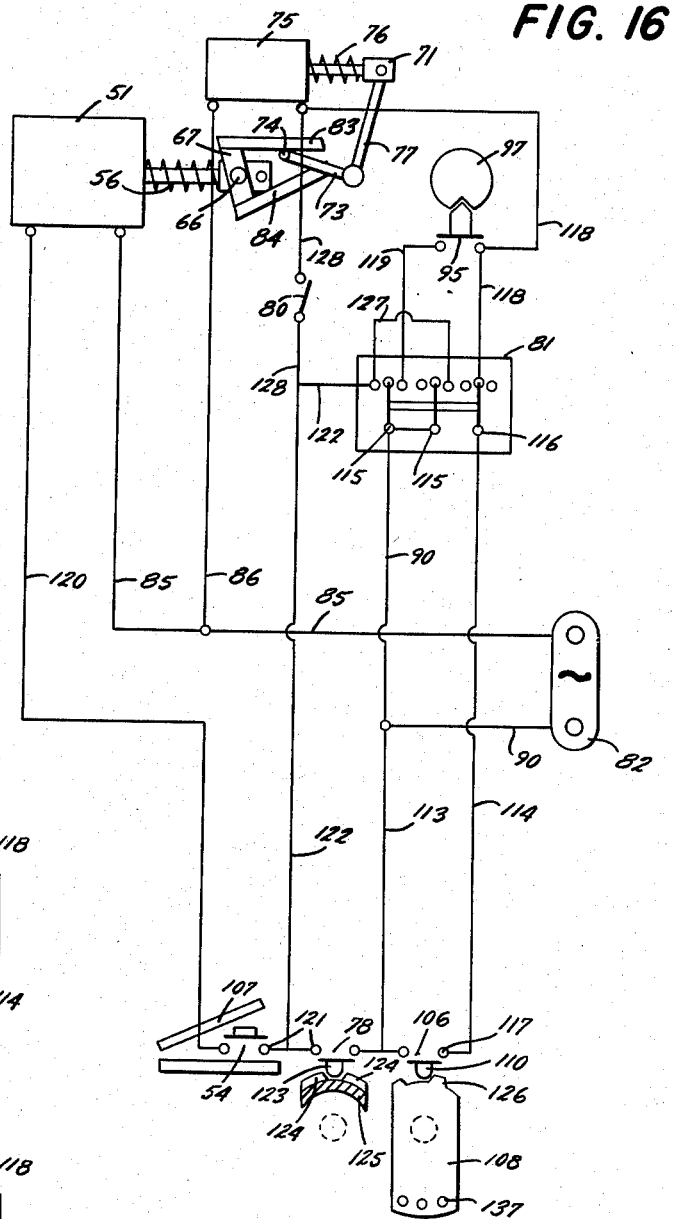
Figure 17:
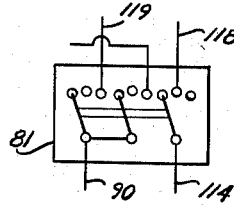
Figure 18:
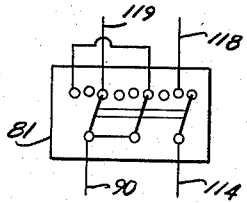

taken along line XIV—XIV of Fig. 12 in the direction of the arrows;

Fig. 15 is a sectional plan view taken along line XV—XV of Fig. 12 in the direction of the arrows;

Fig. 16 is a schematic wiring diagram of the electrical structure of the invention;

Fig. 17 is an illustration of a switch of Fig. 16 in a different position from that shown in Fig. 16; and Fig. 18 shows this latter switch in still another position of the invention.

As an example of operations which may be carried out with the machine of the invention, reference is had to Figs. 1a–3b which show the representative pieces of sheet material required to be cut during the manufacture of a conventional pair of shoes. Thus, referring to Figs. 1a–1b which respectively show the left and right upper toe portions of a pair of shoes, it is necessary to chamfer the edge of each toe portion according to a process which requires edge A to be chamfered first and then edge B. Thus, each of the members shown in Figs. 1a and 1b are chamfered in a series of steps during which the operator chamfers edges AB AB Ab, etc., and it is always necessary to change the adjustment after one edge is chamfered. In other words, the adjustment for chamfering an edge A is different from that for chamfering an edge B and since an edge A is always chamfered after an edge B and since an edge B is always chamfered after an edge A it is not possible to chamfer two edges in succession without changing the adjustment of the guide which guides the sheet material. The left piece shown in Fig. 1a has its chamfering started at the sharp corner shown at the upper right of Fig. 1a while the right piece of Fig. 1b has its chamfering started at the lower left relatively blunt corner shown in Fig. 1b. If chamfering is started with the right workpiece at its sharp corner, which may be desirable under certain circumstances, then the series of cuts is BA BA BA, etc.

The above process assumes that the operator will cut a series of members as shown in Fig. 1a one after the other and then a series of members as shown in Fig. 1b. However, it is often desirable to simultaneously manufacture a pair of shoes while retaining the shoes of each pair together throughout the manufacture thereof, and under these circumstances, the members shown in Figs. 1a and 1b would be chamfered one after the other. With such a process the edges are cut in the sequence AB BA AB BA AB BA, and with such an arrangement a change in adjustment is required only after every second edge is cut since after edge B of the first piece is cut, for example, then the corresponding edge B of the next piece is cut, and the same way for the edges A so that with this arrangement it is possible to leave one setting for two edges.

With the more complicated pieces shown in Figs. 2a and 2b, the sequence of cutting for the left piece shown in Fig. 2a is ABC, ABC, ABC, etc., and for the right piece CBA CBA CBA, etc., the cutting starting at the corners x shown in Figs. 2a and 2b. Thus, with this arrangement it is evident that two of the same edges are never chamfered in succession so that adjustment is required after each edge. Where the parts shown in Figs. 2a and 2b are chamfered in pairs, the chamfering still starts at the corners x, but the sequence is ABC CBA ABC CBA, etc. and it will be seen that first two edges C are chamfered in succession when changing from a left to a right shoe part, for example, and then two edges A are cut in succession. Thus, with this arrangement it is necessary to make an adjustment first after one edge is cut and then after the next two edges are cut.

With the even more complex parts shown in Figs. 3a and 3b the sequence of chamfering is the same when these parts are chamfered in pairs or individually one after another, and this sequence is ABCB ABCB ABCB ABCB, etc., the chamfering of each piece starting at the corner x indicated in Figs. 3a and 3b.

Up to the present time it has not been possible to carry out a sequence of edge chamfering as indicated above in an automatic manner. The present invention provides a machine capable of adjusting a single guide means for the sheet material with a single actuating member accessible to the operator, such as, for example, an electrical switch, to carry out any desired series of adjustments of the guide means in any given sequence with each setting of the guide means being fully independent of the other setting thereof.

Figure 4:
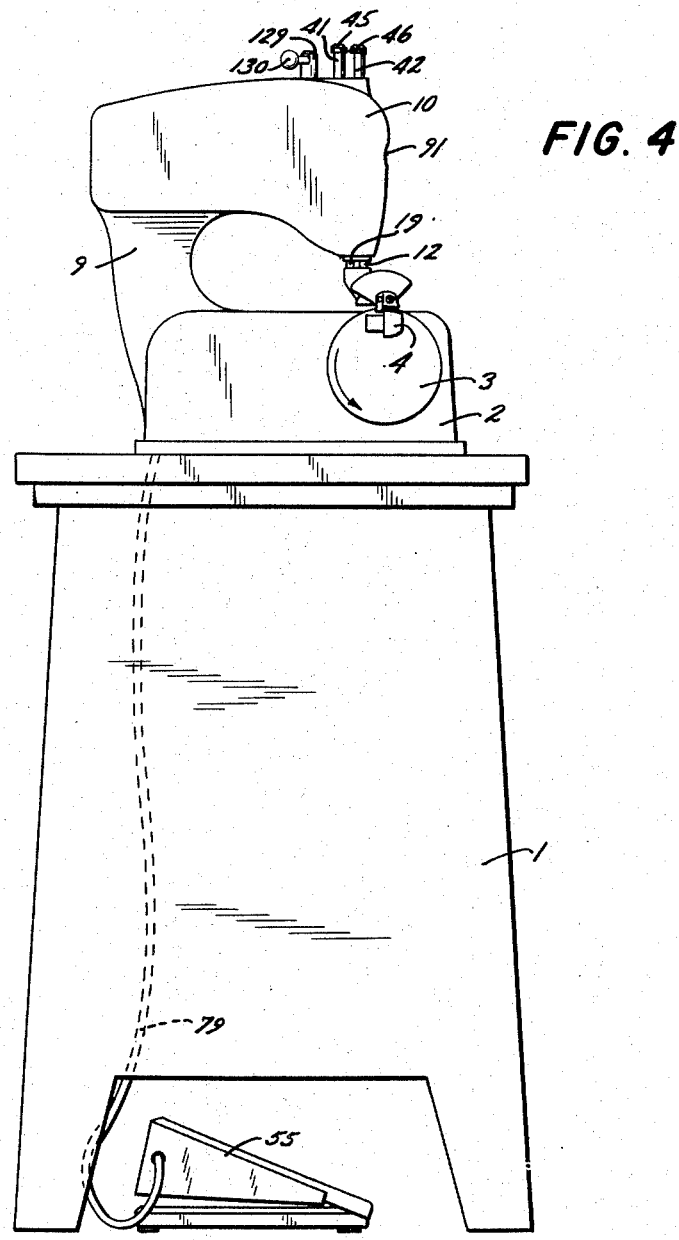
Fig. 4 is a simplified schematic side elevational view of a machine constructed in accordance with the present invention.
Figure 5:
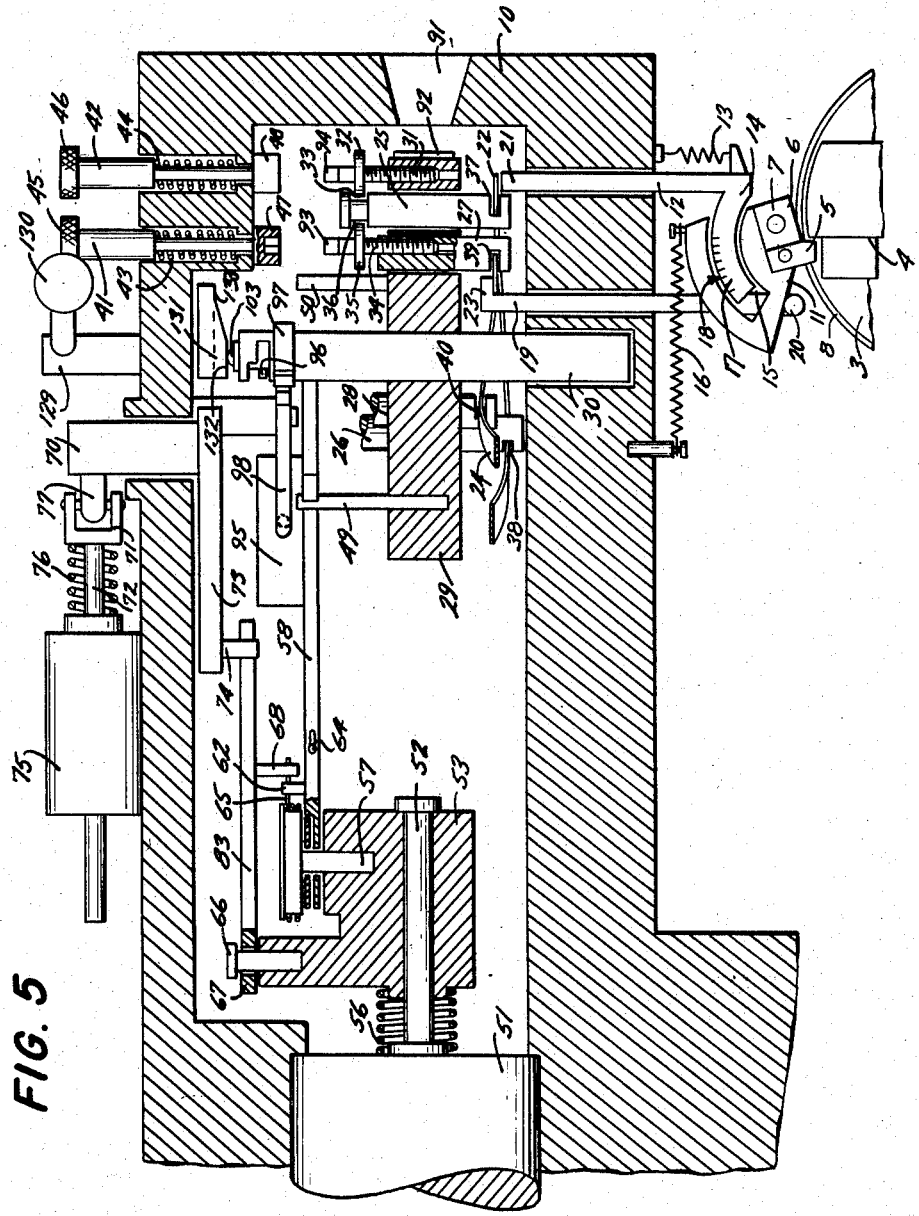
Fig. 5 is a fragmentary, partly diagrammatic, sectional, elevational view through the upper operating head of the machine of Fig. 4 showing parts of the mechanism of the invention located within the operating head.

Referring now to Fig. 4, it will be seen that the machine frame 1 carries a housing 2 forming part of a support means for turnably carrying a cylindrical cutter 3, diagrammatically shown in the drawings and rotated about its axis by any suitable motor or the like (not shown). Furthermore, as is shown in Figs. 4 and 5 a feed roller 4 is provided to feed the sheet material to the cutter 3, this feed roller 4 also being diagrammatically shown in the drawings. The feed roller 4 is supported for turning movement about a horizontal axis as viewed in Figs. 4 and 5, and it will be noted that the curvature of the outer surface of the feed roller 4 corresponds to that of the cylindrical cutter 3. The manner in which the feed roller 4 is supported for turning movement forms no part of the present invention and is well known. The sheet material which is to be cut in addition to being fed by the roller 4 toward the cutting edge 8 of the cylindrical cutter 3 is guided along a side surface of a stop member 5 which in the example illustrated in the drawing is integral with a guide member 7 having a curved guiding edge 6 which intersects the side surface of stop 5 along which the sheet material moves. The guide means 7 is carried by a holder 11 (Fig. 5), and while stop 5 may be separate from guide 7 and carried independently by the holder 11, it is preferred in accordance with the present invention to make the stop 5 integral with the guide 7. The machine of the present invention includes structure for regulating both the distance between guide 7 and cutter 3 in a vertical direction as viewed in Fig. 5, as well as the angle therebetween.

The support means, part of which is formed by the housing 2, includes an upwardly extending arm 9 integral with the housing 2 and carrying hollow operating head 10 in which the mechanism of the invention is located. Referring to Fig. 5, it will be seen that the adjustment means for adjusting the distance in a vertical direction, as viewed in Fig. 5, between the guide means 7 and the cutter 3 includes a rod 12 which is axially movable in a suitable bore of the support means formed by the operating head 10. A spring 13 is fixed at one end of the support means and at its opposite end to a lug fixed to and extending laterally from the rod 12 so as to continually urge the latter upwardly as viewed in Fig. 5. The rod 12 carries at its lower end an arcuate extension 14 which is fixed to the rod 12, as by being formed integrally therewith and which extends laterally therefrom, as shown in Fig. 5, this arcuate extension 14 forming a part of a cylinder whose axis is preferably located at the intersection between the curved guide surface 6 and the stop 5. The holder 11 is formed with an arcuate cutout 15 mating with the extension 14 and into which this latter extension extends so that the holder 11 is turnable on the extension 14 about the axis of the cylinder of which extension 14 forms a part. Thus, axial movement of the rod 12 will regulate the distance between guide means 7 and cutter 3 while turning a holder 11 on extension 14 will regulate the angle between the guide means and cutter 3, this angle being readable on a scale 17 having graduations 18 located on the extension 14, as indicated in Fig. 5. The angular adjustment is provided by a rod 19 having a bottom end 20 making an approximate right angle with the rest of the rod 19 and on which the holder 11 rests, the holder 11 being urged downwardly against the end 20 of the rod 19 by a spring 16 connected at one end to the holder 11 and at its opposite end to the stationary support means. Thus, as the rod 19 moves up and down the angle between guide means 7 and cutter 3 may be regulated independently of the particular elevation of the rod 12. As the holder 11 turns in a counterclockwise direction, as viewed in Fig. 5, to the left from the extension 14, the angle between guiding edge 6 and cutter 3 will increase, while when the holder 11 turns in the opposite direction onto the extension 14 and toward the rod 12, this cutting angle will decrease.

The top end 21 of the rod 12 bears, under the influence of spring 13, against the lower surface of a ring 22 made of a flexible resilient material such as spring steel, for example, and the top end 23 of the rod 19, which is bent from the rod as indicated in Fig. 5, bears downwardly against the top surface of another ring 24 under the influence of the spring 16. The ring 24 is similar to the ring 22 but is of a different diameter. The ring 22 extends into cutouts 37 and 38 of a pair of positioning pins 25 and 28, respectively, so that by adjusting the elevation of these positioning pins 25 and 28 it is possible to locate the parts of ring 22 engaging these pins at predetermined elevations. Thus, for example, the pin 25 shown in Fig. 5 locates the part of ring 22 extending into cutout 37 at a predetermined elevation which controls the distance between guide means 7 and cutter 3 when the pin 25 is in the position shown in Fig. 5, and similarly the pin 28 when it is located in the position of pin 25 shown in Fig. 5, in a manner described below, will regulate the elevation of the rod 12 in accordance with the setting of this pin 28 into whose cutout 38 the ring 22 also extends. The ring 24 similarly extends into a pair of cutouts 39 and 40 respectively formed in a pair of positioning pins 27 and 26, and in the position of pin 27 shown in Fig. 5, it is evident that the elevation of this pin 27 controls the angular setting of the guide means 7. In the same way when the positioning pin 26 is located in the position of pin 27 shown in Fig. 5, in a manner described below, the particular setting of this pin 26 will control the angle of the guide means 7. As is evident from Fig. 5, the positioning pins are arranged in pairs with one pin of each pair controlling the distance of the guide means from the cutter and the other pin of each pair controlling the angle between the guide means and the cutter. Thus, Fig. 5 shows the pair of positioning pins 25 and 27 in their operative position and the pair of positioning pins 26 and 28 spaced from the pair of pins 25 and 27. A third pair of positioning pins is also provided, and the three pairs of positioning pins are angularly spaced from each other by 120° about the stationary shaft 30 fixed to and extending upwardly from the bottom wall of the support means formed by the operating head 10. This shaft 30 supports a body in the form of a drum 29 for rotation about the axis of the shaft 30, the drum 29 being shown diagrammatically in Fig. 5 and being supported by any suitable collars or the like fixed to the shaft 30 for rotation about the latter without axial movement therealong. The drum 29 may take the form of a solid cylinder coaxial with the shaft 30 and formed with an axial bore through which the shaft 30 extends. As is evident from the drawings, the drum 29 is formed with pairs of axial bores into which the pairs of pins 25, 27, and 28, 26, as well as the unillustrated pair freely extend, these pairs of bores of course being spaced angularly from each other by 120° about the shaft 30.

The axial position of the positioning pins is determined by screw means operatively connected to these positioning pins. Fig. 5 shows the screw means associated with the pair of positioning pins 25, 27 and identical screw means is associated with the other two pairs of positioning pins. Thus, referring to Fig. 5 it will be seen that the drum 29 is formed with a threaded bore into which a screw member 31 threadedly extends, this screw member being parallel to shaft 30 and pin 25 and having a collar 32 fixed thereto and extending at its periphery into a cutout 33 formed in the position pin 25. Under the influence of the spring 13, the pin 25 will bear against the collar 32 without any play, and in the same way the spring 13 will eliminate any play between parts 25, 22, and 12, and by turning the screw 31 the collar 32 will move up and down with the screw to regulate the elevation of the positioning pin 25 so that in this way the elevation of the part of ring 22 extending into cutout 37 may also be regulated. A second screw member 34 extends threadedly into a threaded bore formed in the positioning pin 27, as shown in Fig. 5, and this screw member 34 has fixed thereto a collar 35 whose periphery extends into a cutout 36 of the positioning pin 25, the spring 16 eliminating any play between collar 35 and pin 25 as well as between pin 27, ring 24, and rod 19 and holder 11. The spring 13 is stronger than the spring 16 so that the spring 13 determines the position of pin 25 with respect to collar 32 and so that this position cannot be changed by spring 16 within the limits of whatever clearance there is between the cutout 33 and the collar 32. It will be noted that a turning of the screw 31 will adjust the elevation of the guide means 7 without in any way changing the angle thereof, since the angular adjusting means will move as a unit together with the structure for adjusting the distance between the guide means 7 and the cutter 3, and on the other hand, the turning of the screw 34 adjusts the angle of the guide means 7 in a manner completely independent of the particular distance between the guide means 7 and the cutter 3.

Each of the screw members 31 and 34 is provided with a head end through which the screw member is turned. Thus, the screw member 31 has a non-circular head end 94, and the screw member 34 has a non-circular head end 93. The top wall of the operating head 10 is formed with a pair of bores spaced from each other and with respect to the axis of shaft 30 in the same way as the pair of bores which receive the pair of positioning pins 25 and 27. These bores of the top wall of the operating head 10 respectively accommodate a pair of key means 41 and 42 for respectively turning the screws 34 and 31. The key means 41 is provided with a knurled head 45 and is provided with an elongated portion of reduced diameter surrounded by a spring 43 which engages a shoulder of the key means 41 to urge the latter upwardly, the bottom end of the key means 41 carrying the enlargement 47 incapable of passing through the bore of the top wall and formed with a recess having a shape corresponding to that of the head 93. Thus, the key means 41 may be depressed to place the end 47 of the key means 41 about the head 93 so that the latter together with screw 34 may be turned by turning the knurled head end 45 of the key means 41. In the same way, the key means 42 is surrounded by a spring 44 urging the latter upwardly, and the key means 42 has a knurled head 46 and a bottom enlarged end 48 formed with the recess which receives the head end 94 of screw 31 when the key means 42 is depressed. Of course, it is necessary for the positioning pins 25 and 27 to be in the operating position shown in Fig. 5 in order to locate the screw members 34 and 31 respectively in line with the key means 41 and 42. Thus, it is only possible to adjust the screws 34 and 31 when the positioning pins 25 and 27 are in their operating position. A screw means identical with that described is associated with the pair of pins 26, 28 and with the unillustrated pair of pins, and these latter two screw means must also be located in the operating position shown in Fig. 5 before they can be adjusted.

Figure 6:
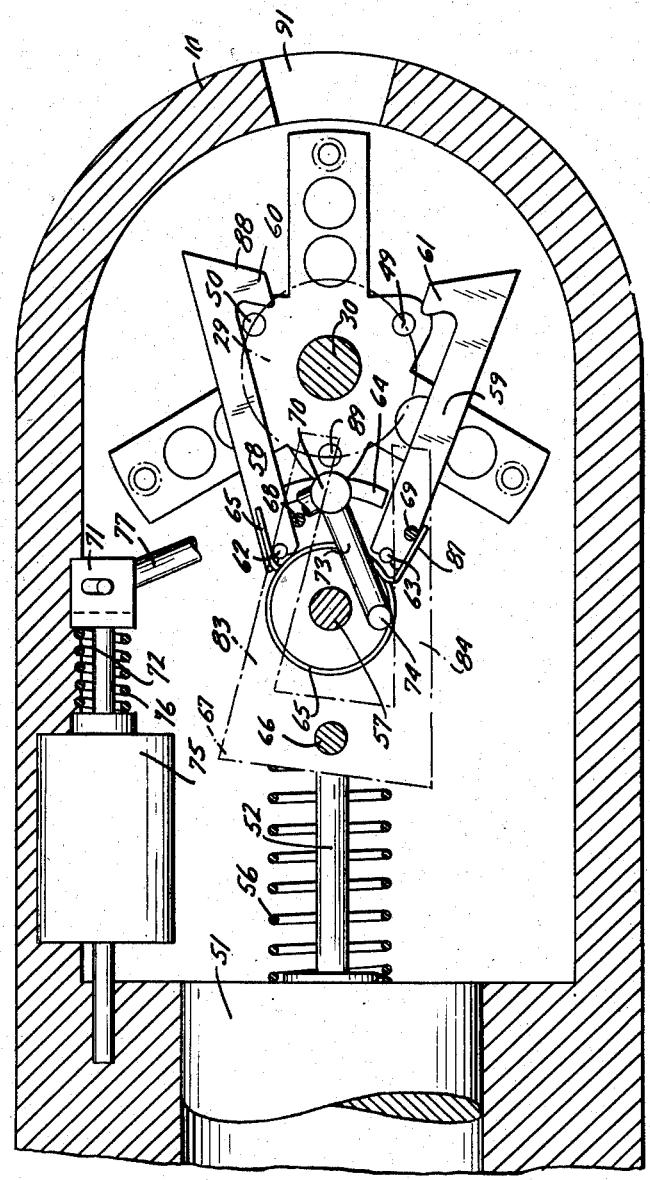
Fig. 6 is a fragmentary top plan view showing diagrammatically parts of the mechanism of Fig. 5 in one operating position thereof.
Figure 7:
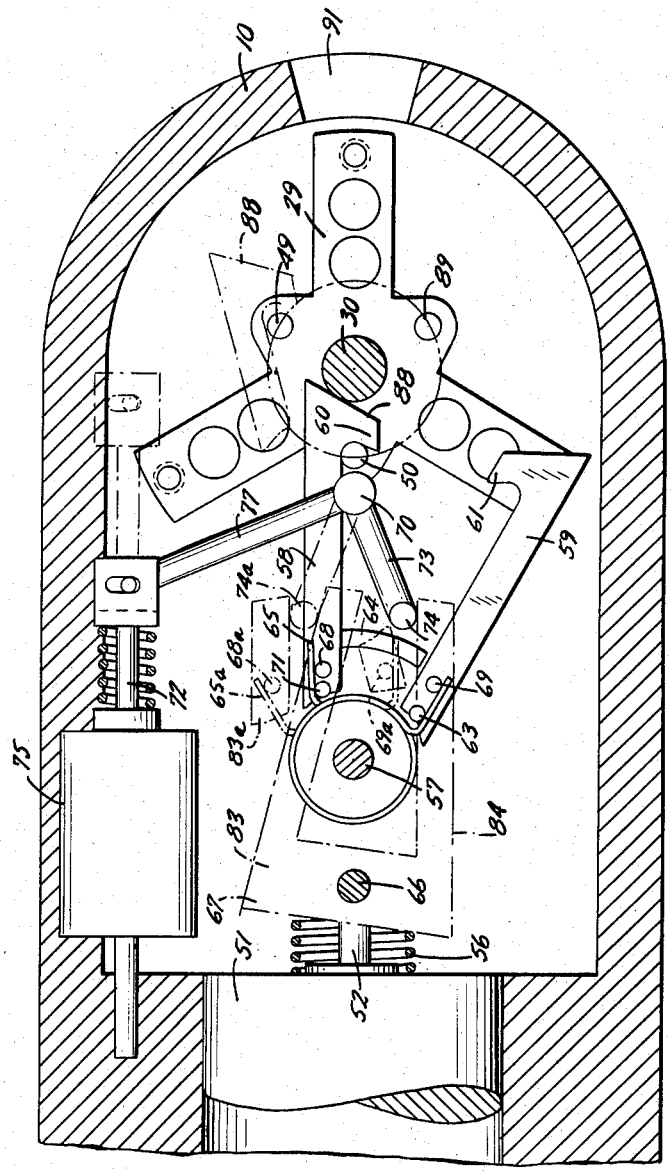
Fig. 7 is a view corresponding to Fig. 6 showing the parts thereof in a different operating position.

In addition to the above described elements connected to the drum 29, this drum carries three turning pins 49, 50, and 89, the pin 89 being shown only in Figs. 6 and 7. These turning pins are all parallel to the shaft 30 and all extend upwardly from the drum 29. The three turning pins are equal in number to the number of pairs of positioning pins and they are spaced angularly from each other by 120° about the shaft 30 in the same way as the three pairs of positioning pins. As will be evident from the description which follows one turning pin corresponds to one pair of positioning pins and when one of the turning pins is located in a given position the pair of positioning pins associated therewith is located in the operating position. Thus, in Fig. 5, the turning pin 49 corresponds with the pair of pins 25, 27 and when the pin 49 is located in the position shown in Fig. 5 the pins 25, 27 are in the operating position also shown in Fig. 5.

The operating head 10, which forms part of the support means in the structure of the invention, carries a solenoid 51 which forms part of a moving means for moving elements within the operating head 10. Armature 52 of the solenoid is shown in Fig. 5.

The armature rod 52 supports a carrier 53 in the form of a block which carries a pivot pin 57 which serves to turnably mount a pair of engaging means 58 and 59 on the carrier 53. These engaging means 58 and 59 (Figs. 6 and 7) are respectively provided with hook ends 60 and 61, and the engaging means 58 and 59 further having pins 62 and 63 respectively fixed thereto and extending upwardly therefrom, only engaging means 58 being visible in Fig. 5. As is evident from Figs. 5–7 each of the engaging means is formed at its left end, as viewed in Figs. 5–7, with a bore through which the pivot pin 57 passes, this pivot pin 57 having an enlarged head end which retains the pair of engaging means 58 and 59 on the carrier 53, and the pair of engaging means 58 and 59 overlap each other at their pivotal connection to the carrier 53 in a manner similar to a pair of scissor blades so that the pair of engaging means 58 and 59 are located in the same horizontal plane and are independently turnable about the pivot pin 57. A spring 65 is coiled about the enlarged head end of the pivot pin 57 and has a pair of free ends engaging the pins 62 and 63, respectively, and urges these pins and the pair of engaging means 58 and 59 toward each other.

The carrier 53 also is provided with a pivot pin 66 on which a positioning means 67 is turnably mounted. This positioning means 67 is in the form of a substantially U-shaped plate having a pair of legs 83 and 84 extending horizontally to the right, as viewed in Figs. 5–7, and located over the pair of engaging means 58, 59. The leg 83 has a pin 68 fixed to and extending downwardly therefrom, and as is evident from Fig. 5 the bottom end of pin 68 overlaps the top end of pin 62 and is also engaged by the spring 65. In the same way the leg 84 carries a pin 69 which is fixed to and extends downwardly from the leg 84, which overlaps the top end of the pin 63, and which is also engaged by the spring 65, as shown diagrammatically in Figs. 6 and 7.

A turning means is provided for turning the positioning means 67, and this turning means takes the form of a lever 77 whose opposite end is fixed to a shaft 70 extending downwardly through a bore in the top wall of operating head 10. The bottom end of the shaft 70 is fixed to an arm 73 which extends laterally to the left from the shaft 70 and which has fixed to its left free end portion a pin 74 which extends downwardly from the arm 73 into the space between the legs 83 and 84 of the turning means 67.

A pin 64 is fixed at one end to the pivotal engaging means 58 and extends toward the other engaging means 59 so that this pin 64 limits the movement of the pair of engaging means 58 and 59 toward each other. The spring 65 thus acts with its free ends on the pins 62 and 63 to urge the pair of engaging means 58 and 59 toward each other.

The shaft 70 is carried by the support means formed by housing 10 only for rotation about its axis, and the upper end of the shaft 70 which extends to the exterior of the housing 10 is fixed to an arm 77 whose end portion distant from shaft 70 is pivotally connected to a fork 71 fixed to the outer free end of an armature 72 of a solenoid 75 carried by the housing 10 at the exterior thereof. A spring 76 is coiled about the armature 72 and engages the solenoid 75 and the fork 71 to urge the latter to the right, as viewed in Figs. 5–7.

When the solenoid 75 is energized the pin 74 will be in the position shown in Fig. 6, and in this position the pin 74 will engage the arm 84 of the positioning means 67 to maintain the arm 84 in a position where it extends in the direction shown in Fig. 6 during energizing and de-energizing of the solenoid 51, the arm 84 sliding along the pin 74 during reciprocation of the armature 52. The pin 69 depending from the arm 84 engages the free end 87 of the spring 65 so that the latter maintains the arm 84 in engagement with the pin 74. In this position of the parts the engaging means 58 is located in its operative position by the action of spring 65 on pin 62 while pin 64 maintains the arm 59 turned to its inoperative position where it moves back and forth without engaging either the shaft 30 or any of the pins 49, 50, and 89. As the engaging means 58 moves to the right toward the position shown in Fig. 6 upon de-energizing of the solenoid 51, the inclined surface 88 of the hook portion 60 of the engaging means 58 rides first along the shaft 30 and then along the pin 50 until the hook portion 60 snaps over the pin 50 when the armature 52 reaches the end of its stroke to the right under the action of spring 56, as viewed in Fig. 6. Thus, when the solenoid 51 is again energized to draw the armature 52 to the left, as viewed in Fig. 6, the hook 60 will engage the pin 50 so as to turn the latter together with drum 29 in a counter-clockwise direction, as viewed in Fig. 6, until the pin 50 reaches the position of the pin 89 shown in Fig. 6. The parts are shown in solid lines at the end of this stroke of the armature 52 in Fig. 7, and it will be noted that the pins 49, 50, and 89 have been displaced in a counter-clockwise direction through 120° from the position of Fig. 6. It is thus apparent that as long as the solenoid 75 is energized, the drum 29 will be turned in a counter-clockwise direction as viewed in Figs. 6 and 7 through 120° each time the solenoid 51 is energized.

When solenoid 75 is not energized, the spring 76 acts to place the parts in the dot-dash line position shown in Fig. 7. Thus, the pin 74 will become located at position 74a, and as a result the pin 74 will engage the arm 83 of the positioning means 67 to move this arm 83 to the position 83a, and the pin 68 moves together with the arm 83 to the position 68a so as to locate the free end of spring 65 which engages pin 68 in the position 65a. The arm 83 in the position 83a thereof engages and slides along the pin 74 when the latter is in position 74a, and the arm 83 at this time is and remains parallel to the armature 52 while the arm 84 is now at an angle to the axis of the armature 52 and locates the pin 69 in the position 69a. As a result the engaging means 58 is turned outwardly to an inoperative position where it moves past shaft 30 and pins 49, 50 and 89 without engaging the latter, and the engaging means 59 is now operative and co-operates with the pins 49, 50 and 89 to turn the drum 29 is a clockwise direction, as viewed in Figs. 6 and 7, each time the solenoid 51 is energized. Thus, as long as the solenoid 75 is unenergized the drum 29 will be turned in a clockwise direction through 120° each time the solenoid 51 is energized.

The outer periphery of the drum 29 carries graduations 92 which are visible through a window 91 (Fig. 5) so that the operator can see through the window 91 the position of the drum 29. As is apparent from Figs. 6 and 7, the drum 29 has a central portion from which three arms radially extend, these arms carrying the positioning members 25, 27 and 26, 28 as well as the pair of positioning members not illustrated in Fig. 5, respectively.

The machine of the invention can be set so as to automatically reverse the direction of turning of the drum 29 either after the latter turns through 120° or after the drum 29 turns through 240°, and the structure for accomplishing this result is shown in Figs. 8–11. Referring to Figs. 8–11 it will be seen that the shaft 30 (Fig. 11) is formed with an axial bore at its upper end portion, and a spring 112 is located in this bore and acts on a pin 103 which is axially slidable in the bore to urge the pin 103 upwardly into engagement with the bottom face of a manually adjustable cam 131 carried by a shaft 129 (Fig. 5) which is carried by the housing 10 only for turning movement about its axis. A handle 130 is fixed to the shaft 129 so that the operator can turn the shaft 129 to an angular position which locates either the camming surface 132 or the camming surface 133 of cam 131 in engagement with the top end of the pin 103, the spring 112 maintaining the pin 103 at all times in engagement with the cam 131. As is apparent from Fig. 11, the pin 103 is at a higher elevation when it engages camming surface 133 than when it engages the camming surface 132.

A pin 96 is fixed to and extends radially from the pin 103 through and beyond an axial slot formed in the shaft 30, this slot being long enough to provide the desired axial movement of pins 96 and 103 depending upon whether the latter is engaged by camming surfaces 132 or 133. The shaft 30 turns together with the drum 29 and of course the pin 96 turns with the shaft 30. An annular reversing cam 97 rests on a shoulder of the shaft 30 and is turnable with respect to shaft 30, the annular cam 97 being formed with a notch 111 and a notch 100 which is deeper than the notch 111. A bell crank 98 is pivotally carried by the machine and has an end 99 which cooperates with the notches 100 and 111. The end of bell crank 98 opposite from the end 99 thereof, shown at 101, cooperates with a button 102 of a reversing switch 95 which includes a spring urging the button 102 outwardly of the switch housing so that the end 99 of the bell crank 98 is maintained in engagement with the periphery of the reversing cam 97. This cam 97 is provided with a cutout having an upper portion 104 which extends through slightly less than 120° (Fig. 9) and a lower portion 105 which extends through slightly less than 240° (Fig. 10). The pin 96 is located either in the cutout portion 104 or in the cutout portion 105 depending upon the position of the cam 131. When camming surface 133 of the latter engages pin 103, the pin 96 is in cutout portion 104, and when camming surface 132 engages pin 103, the pin 96 is in cutout portion 105. The switch 95 is open when the end 99 of lever 98 is in the notch 100 and is closed when the end 99 of lever 98 is in the notch 111. As will be apparent from the description below, when the apparatus is set for automatic operation, the closing and opening of the switch 95 controls the solenoid 75. When the end 99 of lever 98 is in the notch 100, the pin 96 will engage and turn the cam 97 just before the shaft 30 completes a turn of 120° if pin 96 is in cutout portion 104 or a turn of 240° if pin 96 is in cutout portion 105 in order to move the notch 111 into engagement with the end 99 of the lever 98 and thus energize the solenoid 75 to reverse the direction of rotation of the drum 29, and then just before the shaft 30 completes a turn in the opposite direction of 120° if pin 96 is in cutout portion 104 or a turn of 240° if pin 96 is in cutout portion 105 the pin 96 will engage and turn the cam 97 to locate the notch 100 in engagement with the end 99 of lever 98 so as to deenergize the solenoid 75 in order to cause the direction of turning of the drum 29 to reverse again. In this way, when the switch 95 is placed in the circuit of the machine in a manner described below the direction of rotation of the drum 29 can be reversed either after 120° or after 240°, so that it is possible to operate the machine automatically so that the drum 29 turns back and forth between any two of its three positions or so that the drum 29 turns in the same direction to two of its three positions and then reverses itself.

As is apparent from Fig. 4, the operator may control the machine through actuation of a foot pedal 55 in an electrical manner, a cable 79 including all of the leads which interconnect the structure of the foot pedal with the solenoids and with the switch 95 as well as with additional switches referred to below. The details of the foot pedal 55 are illustrated in Figs. 12–15. Referring to Figs. 12–15, it will be seen that the foot pedal includes a base plate 142 which rests on the floor and which has a pair of lugs 143 between which a horizontal pin 144 is supported. A member 139 is formed with a bore through which the pin 144 passes so that the member 139 is turnable about the axis of the pin 144, and the member 139 is formed with a bore through which a pivot pin 138 passes so that the latter is supported for turning movement about its axis by the member 139. The upper plate 107 of the pedal which is directly engaged by the foot of the operator is connected to the pin 138 so that with this structure the plate 107 can be turned in a counterclockwise direction about the axis of the pin 144, as viewed in Fig. 12, in order to depress the pedal, and the plate 107 can be laterally turned about the axis of pin 138 to any of the positions A, B, C shown in Fig. 15 for a purpose described below.

The member 139 has a pair of legs 140 (Fig. 15) integral with and extending therefrom, and the free ends of these legs rest upon a shoulder 141 formed in the upper face of the base plate 142 so that in this way turning of the plate 107 in a clockwise direction about the pin 144 is limited. An extension 135 of non-circular cross section is fixed to and extends downwardly from the plate 107, and the bottom free end of the extension 135 is located between the legs 140 so that the latter engage extension 135 to limit the lateral turning of the plate 107.

As will be described below, the solenoid 51 may be energized by the closing of a switch 54. This switch 54 is carried by the left free end portion of the plate 107, as viewed in Fig. 12, and includes a spring pressed button 151 whose free end at the exterior of the switch 54 is located adjacent an inclined upper face 152 of the plate 142. Thus, whenever the operator depresses the plate 107 of the foot pedal the button 151 will engage the surface 152 in order to close the switch 54 when the pedal is turned in a counterclockwise direction about the pin 144, as viewed in Fig. 12, through a given angle.

In order to locate the plate 107 accurately in positions A, B or C, the plate 107 has fixed to its underside a strip 145 provided in its bottom face with three notches 146, shown most clearly in Fig. 13. A roller 147 is turnably carried by the upper end portion of a tube 148 which telescopically surrounds and is axially slidable along a tube 149 fixed to and extending upwardly from the surface 152 of the base plate 142. A spring 150 within the tube 149 engages with its upper end a transverse surface within the tube 148 so as to urge the latter upwardly and thus maintain the roller 147 in engagement with the strip 145. When the pedal 107 is in any of the positions A, B or C the operator can feel the movement of roller 147 into one of the notches 146, and thus the pedal is accurately located in any one of its three lateral positions.

Beneath the member 139, the base plate 142 turnably supports a plate 108 which is coaxial with the pivot pin 138 and which is turnable about the axis thereof. The plate 108 is provided at its left end, as viewed in Fig. 12, with a part 109 having a pair of camming portions 126 (Fig. 15), and a bracket 125 is fixed to and extends downwardly from the underside of the plate 108, this bracket 125 carrying a pair of cams 124 (Fig. 14). The cams 124 and a roller 123 of a switch 78 cooperate with each other so that when the roller 123 is between the cams 124 the switch 78 is open while when the roller 123 is engaged by either of the cams 124 the switch 78 is closed, this switch 78 being a safety switch to prevent energizing of the solenoid 51 a second time if the pedal is depressed a second time without being turned to a different lateral position when the machine is set for automatic operation. The cams 126 of the plate 108 cooperate with a roller 110 of a switch 106 to close this switch whenever the roller 110 is engaged by one of the cams 126.

A structure is provided to cause the plate 108 and the cams connected thereto to turn laterally with plate 107 whenever the latter is laterally turned by the operator and at the same time to cause the plate 108 to return automatically to its central position after the plate 107 has been depressed and has closed the switch 54. This structure includes the three openings 137 formed in the right end portion of plate 108, as viewed in Figs. 14 and 15, and the pin 136 fixed to and extending downwardly from the extension 135 and adapted to be received by anyone of the openings 137. A spring 134 is coiled about a part of the base plate 142 which pivotally supports the plate 108 and the free ends of the spring 134 act on a pin fixed to and extending downwardly from the underside of the plate 108 in order to return the latter to its central position where the longitudinal axis of the plate 108 coincides with the central position B of the plate 107. To change the lateral position of the latter the operator turns this plate with its extension 135 about the axis of the pin 138 before depressing the plate 107, and the pin 136 is in one of the openings 137 so that the plate 108 turns together with the plate 107. When the latter is in the desired position, the operator depresses the pedal so as to close the switch 54, and after the switch 54 is closed the pin 36 moves out of the opening 137 in which it was located and the spring 134 returns the plate 108 to its central position, while the plate 107 remains in the lateral position to which it has been turned so that upon release of the plate the pin 136 moves into a different opening 137. As is apparent from Fig. 15, the plate 107 turns through an angle α whenever the operator turns this plate from the position B to either of the positions A or C, while when turning between positions A and C the plate 107 turns through an angle 2α. On the other hand, as is evident from Figs. 14 and 15, the plate 108 can turn in either direction from its central position through an angle α or 2α.

The electrical circuit of the machine is shown in Fig. 16. This circuit includes a multiple switch 81 accessible to the operator and adapted to be placed in any one of three positions. When the multiple switch is set to provide arbitrary operation, the switch 81 has the position shown in Fig. 16. When the multiple switch 81 is set to cause the drum 29 to turn automatically in the same direction at each actuation of the pedal 107 the multiple switch has the position shown in Fig. 17, while when the machine is set to provide automatic reversing of the drum 29 the multiple switch has the position shown in Fig. 18. The above described solenoids 51 and 75 together with the positioning means 67 and pin 74 are shown diagrammatically in Fig. 16, and the pedal structure is also shown diagrammatically in Fig. 16. A pair of lines 85 and 90 are connected to a suitable source of current 82. The circuit also includes a manually operable switch 80 which is accessible to the operator, this switch 80 being closed by the operator whenever the multiple switch 81 is in the position of Fig. 17 and it is desired to maintain the solenoid 75 energized so that the drum 29 will continue to turn at each actuation of the solenoid 51 in a counterclockwise direction, as viewed in Figs. 6 and 7.

Assuming that the multiple switch 81 is in the position shown in Fig. 17 and that the switch 80 is closed, the current will flow along the line 90 through the switch 81 along the lines 122 and 128 to the solenoid 75 and through the latter back along the lines 86 and 85 to maintain the solenoid 75 energized so that the engaging means 59 is maintained in its inoperative position while the engaging means 58 is maintained in its operative position. Whenever the operator depresses the pedal 107, the switch 54 will be closed and the current will flow from the line 90 through the switch 81 along the line 122 through the switch 54 and then along the line 120, through the solenoid 51, and back along the line 85. Thus, with the parts in this condition each actuation of the pedal will cause the drum 29 to turn in a counterclockwise direction, each time the pedal is depressed, and thus, as may be seen from Figs. 9 and 10 the drum will be turned continuously to the positions A, C, B, A, C, B, etc.

Should the operator desire to turn the drum 29 in the reverse direction at each actuation of the pedal, it is only necessary for the operator to open the switch 80 so that the solenoid 75 remains unenergized, the multiple switch 81 remaining in the position shown in Fig. 17. At this time the current will not flow to the solenoid 75 so that the positioning means 67 is maintained in the position diagrammatically shown in Fig. 16, and as a result the engaging means 59 will be operative to turn the drum in a clockwise direction, as viewed in Figs. 6 and 7, each time the solenoid 51 is energized, in order to energize the solenoid it being necessary only to depress the pedal 107 at this time. The current will flow from the line 90 through the switch 81 and along the line 122 through the switch 54 and then along the line 120 and through the solenoid 51 and finally back through the line 85.

When it is desired to provide automatic reversal of the drum 29, the multiple switch 81 is placed in the position shown in Fig. 18. Now the current will flow along the line 90 and through the switch 81 to the line 119 so as to flow to the switch 95 whose position is controlled by the reversing cam 97 as described above in connection with Figs. 8–11. If the reversing switch 95 is open the drum 129 will turn in a clockwise direction, as viewed in Figs. 6 and 7, either through 120° or 240° at which time the reversing switch 95 will be closed and then the current will flow through this switch along the line 118 to the solenoid 75 and from the latter back through the lines 86 and 85. With the switch 81 in the position of Fig. 18, each time the pedal 107 is depressed the current flows along the line 90, through the switch 81, and along the line 127 to the line 122 and from the latter through switch 54, line 120, and solenoid 51 back through line 85. Of course, when the drum now turns through 120° or 240°, depending upon the position of the cam 131, the reversing switch 95 will be opened, and the direction of turning of the drum 29 will again change.

It will be noted that when the switch 81 is set in the positions of Figs. 17 or 18, the switches 78 and 106 do not enter into the operation. When the operator desires to operate the machine arbitralily so as to locate the drum at any one of its three positions in accordance with lateral turning of the pedal 107, these switches 78 and 106 enter into the operation. At this time the switch 81 has the position shown in Fig. 16, from which it is evident that the switches 80 and 95 do not enter into the operation. Assuming that the pedal 107 is in the position B shown in Fig. 15 and that the operator desires to place the drum in the position A, the operator will turn the pedal in a counterclockwise direction, as viewed in Fig. 15, so that the longitudinal axis of the pedal extends through the position A shown in Fig. 15. As is evident from Fig. 16, the plate 108 will turn with the pedal 107 and the cams 124 and 126 will respectively close the switches 78 and 106. The closing of the switch 106 completes a circuit through the solenoid 75 so that the latter becomes energized, the current flowing along the lines 90 and 113 through the switch 106 and along the line 114, switch 81 and line 118 through the solenoid 75 and back through the lines 86 and 85. Thus, the positioning means 67 will have been positioned to cause the drum 29 to turn in a counterclockwise direction, as viewed in Figs. 6 and 7, and thus upon energizing of the solenoid 51 the drum will be turned to position A, the position A assuming the place of the position B, as is evident from Figs. 9 and 10. The solenoid 51 is now energized upon depression of the pedal 107, the current flowing along the lines 90 and 113 and through the switches 78 and 54 along the line 120 to the solenoid and from the latter back through the line 85. The depression of the pedal 107 causes the pin 136 to move out of the central opening 137 so that after energizing of the solenoid 51 the spring 134 returns the plate 108 and the cams connected thereto to the position shown in Fig. 16, and when the operator releases the pedal 107, the pin 136 will enter the right opening 137 shown in Fig. 16. It will be noted that the return of the plate 108 to its central position opens the switches 78 and 106, and because of the opening of the switch 78 a second depression of the pedal 107 will not energize the solenoid 51, so that switch 78 acts as a safety switch.

With the pedal 107 in position A and the drum 29 in position A, the operator can at will actuate the pedal so as to return the drum to position B or so as to directly place the drum in position C. If the operator wishes to place the drum back in the position B, the turning of the pedal 107 to the position B will cause the plate 108 to turn so that the right opening 137 shown in Fig. 16 turns to the position of the central opening 137. It is evident that the switch 106 will not be closed so that the solenoid 75 will not be energized and thus when the solenoid 51 is energized the drum 29 will turn in a clockwise direction through 120°, as viewed in Figs. 6 and 7. It will be noted that the turning of the plate 108 causes the switch 78 to close so that the solenoid 51 becomes energized upon depression of the pedal 107. When the latter is released the plate 108 returns to its central position.

If the operator wishes to turn the drum from the position A directly to the position C, then the pedal 107 is turned in a clockwise direction, as viewed in Fig. 15, so that its central axis passes through the position C. As may be seen from Fig. 16, the engagement of the pin 136 with the right opening 137 of plate 108 causes the left cam 126 to close the switch 106 and thus the solenoid 75 becomes energized. Thus, while the pedal 107 has been turned in a clockwise direction through two of its positions the drum 29 will be turned in a counterclockwise direction through one position, and thus the same result will be obtained as if the drum 29 were turned in a clockwise direction through two positions. Thus, with the structure of the invention whenever the pedal 107 is turned through one position the drum 29 turns in the same direction as the pedal 107 through one position, while when the pedal 107 is turned through two positions, the drum 29 will be turned in a direction opposite to the pedal 107 through only one position. It is apparent therefore that the multiple switch 81 when placed in the position shown in Fig. 16 enables the operator to locate the drum 29 arbitrarily at any one of its three positions.

Before the operations are started, the drum 29 is adjusted so as to be in operating position B when the foot pedal 107 is in its intermediate position B.

Fig. 16 shows the contacts 115 and 116 of the switch 81 to which the lines 90 and 114 are respectively connected.

It will be understood that each of the elements described above, or two or more together, may also find a useful application in other types of sheet cutting apparatus differing from the types described above.

While the invention has been illustrated and described as embodied in automatic sheet cutting apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptation should and are intended to be comprehended within the meaning and range of equivalence of the following claims.

What is claimed as new and desired to be secured by Letters Patent is:

1. In a machine having parts which are adapted to be set at a plurality of different operating positions, in combination, support means; a drum turnably carried for rotation about its axis by said support means, said drum being operatively connected with the machine parts which are to be set at different operating positions for setting said parts at different operation positions when said drum is in different angular positions, respectively, with respect to its axis; a plurality of pins fixed to said drum and extending parallel to the axis thereof, said pins being equal to the number of angular positions of said drum and being uniformly distributed about the axis thereof; a first solenoid carried by said support means and having a reciprocable armature; a pair of engaging means carried by said armature for reciprocating movement therewith and each being movable with respect to said armature to and from an operating position adapted to engage said pins for turning said drum, one of said engaging means when it is in its operating position engaging one of said pins during reciprocation of said armature to turn said drum in one direction and the other of said engaging means when it is in its operating position engaging one of said pins to turn said drum in an opposite direction during reciprocation of said armature; positioning means carried by said armature for reciprocation therewith and cooperating with said engaging means for placing one or the other of said engaging means in its operating position; lever means cooperating with said positioning means for actuating the latter to place a selected one of said engaging means in its operating position; and a second solenoid operatively connected with said lever means for placing the latter in a position acting on said positioning means to locate one of said engaging means in its operating position when said second solenoid is energized and for placing the other of said engaging means in its operating position when said second solenoid is unenergized.

2. In a machine as recited in claim 1, an electrical circuit including said solenoids and including a switch capable of being closed and open by the operator for energizing and deenergizing said second solenoid, respectively.

3. In a machine as recited in claim 1, an electrical circuit including said solenoids; an electrical switch means adjustable at the will of the operator for controlling said second solenoid to cause said drum to turn through preselected angles in preselected directions.

4. In a machine having parts which are adapted to be set at three different operating positions, in combination, support means; a drum turnably carried for rotation about its axis by support means between three angular positions spaced from each other by 120° about said axis, said drum setting said machine parts at said three different positions when said drum is at said three different positions thereof, respectively; operator-controlled means cooperating with said drum for turning the latter from one of its positions; and electrical control means capable of being set by the operator to control the sequence of movement of said drum between its positions each time said operator-controlled means is actuated.

5. In a machine as recited in claim 4, said electrical control means also being capable of being set to permit the operator to determine arbitrarily the position to which the drum will be turned upon actuation of said operator-controlled means.

6. In a machine having parts which are to be set at different operating positions, in combination, support means; a shaft carried for rotation about its axis by said support means for turning movement to different angular positions respectively controlling the location of the machine parts in the different positions thereof, respectively, said shaft being formed with an axial bore and with an axial slot communicating with said bore; an axial pin slidable in said bore and a radial pin fixed to said axial pin and extending through said slot to the exterior of said shaft, said axial pin extending outwardly beyond an end of said shaft; spring means acting on said axial pin for urging the latter outwardly of said shaft; manually operating cam means cooperating with said axial pin for determining the extent to which the latter extends outwardly beyond said shaft and for thus determining the axial position of said radial pin along the axis of said shaft, said cam means having two positions where said radial pin is located at two different positions, respectively, along the axis of said shaft; an annular cam surrounding said shaft and said shaft being freely turnable with respect to said annular cam, said cam having an arcuate cutout portion of a first predetermined angular length in which said radial pin is located in one of the axial positions thereof and a second arcuate cutout portion of a second predetermined angular length in which said radial pin is located in the other of said axial positions thereof, whereby said annular cam will be turned by said radial pin when said shaft turns through a first angle when said radial pin is in one of said cutout portions and said annular cam will be turned by said radial pin after said shaft turns through a second angle when said radial pin is in the other of said cutout portions of said annular cam; and a switch connected operatively to said annular cam to be opened and closed by the turning thereof.

References Cited in the file of this patent

UNITED STATES PATENTS

| | | |
|---|---|---|
| 1,987,534 | McDonough | Jan. 8, 1935 |
| 2,482,550 | Koertge et al. | Sept. 20, 1949 |
| 2,769,329 | Braun et al. | Nov. 6, 1956 |
| 2,812,402 | Dixon | Nov. 5, 1957 |